Feb. 1, 1966    W. P. SENETT    3,233,107
COHERENT GAMMA RADIATION
Filed June 25, 1962
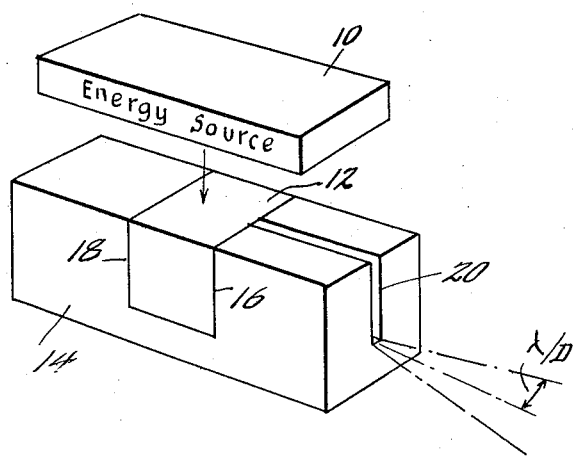
INVENTOR
*W. P. Senett,*
BY *Watson, Cole, Grindle & Watson*
ATTORNEYS

United States Patent Office 3,233,107
Patented Feb. 1, 1966

3,233,107
COHERENT GAMMA RADIATION
William P. Senett, Jericho, N.Y., assignor to Leesona Corporation, Warwick, R.I., a corporation of Massachusetts
Filed June 25, 1962, Ser. No. 204,756
17 Claims. (Cl. 250—84)

This invention relates to a method and apparatus for producing coherent gamma radiation.

Optical masers are well known in the art. The term "maser" is an abbreviation for microwave amplification by stimulated emission of radiation. The principles of optical masers have been employed in numerous devices to produce coherent radiation. Coherent light radiation is that radiation in which a definite phase relationship exists from point to point in all parts of the beam. Any radiation which is coherent may be controlled, directed and modulated and in certain instances, coherent beams may be employed in communication or as micro welders, as precise frequency standards, as a tool in detection study and may even be used in surgery to suture, cauterize, or sterilize.

I have discovered that the principle of optical masers, sometimes called lasers, for light amplification by stimulated emission of radiation can be extended to gamma radiation.

Accordingly, it is an object of this invention to provide a method for producing coherent gamma radiation.

It is another object of this invention to provide a device for producing coherent gamma radiation.

It is another object of this invention to produce coherent gamma radiation by utilizing of neutron sources as an energy input source for energizing the gas liquid or solid which can be excited in the nucleus.

It is a still further object of this invention to provide a coherent gamma radiation system utilizing an alpha particle source as the energy input to the system.

It is a still further object of this invention to provide a proton source as the energy input source for the radiation system.

Briefly, in accordance with aspects of this invention, a source of energy is employed to excite the nucleus of material in a container. When this material is excited it produces reflections within the container by virtue of the Bragg effect. The radiation couples reversibly to the nuclear sources provided these materials exhibit the Mossbauer effect. This effect may be produced in known types of materials. When this effect is produced, coherent gamma radiation is produced between the opposing walls of the container. If a small aperture is produced in one of these opposed walls, then the coherent gamma radiation will be emitted through the aperture. The emitted radiation may then be employed in a manner well known in the art, such as that of producing any one of the previously mentioned useful results.

These and various other objects and features of the invention will be more clearly understood from a reading of the detailed description of the invention in conjunction with the drawing.

As depicted in the drawing, an energy source 10 is positioned to direct energy upon an active medium 12 contained in a slot in a single crystal 14. Advantageously, the energy source may be a source of neutrons, alpha particles, or protons. The active medium may be of gas, a liquid or a solid, which can be excited in the nucleus, that is a material which has a pair of levels which satisfy the conditions that the upper level has a higher population than the lower level. When this material is placed in a single crystal having accurately flat and parallel walls opposing each other, such as walls 16 and 18 in crystal 14, then the material produces coherent gamma radiation spontaneously when it is excited from the energy source. The end walls 16 and 18 may establish a "standing wave" condition for gamma rays within the material. The crystal 14 may be formed of any convenient single crystal material, such as NaCl, CaCl, CdS, or diamond. It is understood that if a gas is employed as the active medium, then the recess in the crystal will have to be enclosed to confine the gas.

One convenient way to extract coherent gamma radiation from this system is by drilling or otherwise cutting a small hole or slit 20, such as is indicated in the drawing. Gamma radiation will then be transmitted through this sampling hole 20 and may be utilized in any convenient manner to produce the useful results of communication, welding, surgery or any other desired result well known in the art. By way of explanation, it is to be noted that gamma radiation arises as a result of non-electronic transitions inside the nucleus of the material which is excited. This is in contrast with the production of X-ray radiation which arises as a result of electronic transitions outside the nucleus.

In forming a single crystal container 14, a cavity is cut in the crystal with the opposite walls 16 and 18 as closely parallel as is possible to form. The wavelength of the gamma radiation is comparable to the lattice spacing of the crystal for Bragg reflection to occur. Since the gamma radiation is an extremely sharp frequency, the crystal may be tuned by varying the temperature of the crystal.

The directivity of the gamma radiation beam is much greater than that of beams of lower frequencies. The ratio of wavelength to diameter of the beam, marked $\lambda/D$ in the drawing, is a measure of the spread of the beam. A narrow beam permits longer range communication or, conversely, a lower power gamma beam will provide the same range communication as a higher power level laser. Further, more channels of communication are possible with a coherent gamma radiation than with an optical maser. Gamma radiation is more penetrating than beams from lasers.

While I have shown and described one illustrative embodiment of this invention, it is understood that the concepts thereof can be employed in other embodiments without departing from the spirit and scope of this invention.

What is claimed is:

1. A coherent gamma radiation system comprising a nuclear excitation source, a container comprising a single crystal having opposed flat parallel walls, a material disposed between the walls which can be excited in the nucleus, said container being positioned to receive energy from said source wherein the material is chosen so that the gamma radiation produced between the opposing walls is coherent.

2. A system as defined in claim 1, wherein the material exhibits the Mossbauer effect.

3. A system as defined in claim 2, wherein the nuclear excitation source provides a stream of neutrons which impinges upon said material.

4. A coherent gamma radiation system comprising an alpha particle source, a container comprising a single crystal having opposed flat parallel walls positioned in the path of alpha particles from said source and material in said container between said walls which material is comprised of atoms in which pairs of nuclear levels satisfy the condition that the upper level has a higher population than the lower level, whereby said material emits coherent gamma radiation when subjected to alpha particles from said alpha particle source.

5. A coherent gamma radiation system comprising a container comprising a body having opposed flat parallel walls, a material disposed between said walls which satisfies the physical requirement that atoms of the material have a pair of levels in which the upper level has a higher population than the lower level and proton source means positioned to direct protons into said container and onto said material.

6. The system according to claim 5, wherein said material is a gas.

7. The system according to claim 5, wherein said material is a liquid.

8. The system according to claim 5, wherein said material is a solid.

9. The system according to claim 5, wherein said container is a single crystal material.

10. A coherent gamma radiation system comprising a neutron source, a single crystal container having opposed walls positioned in the path of neutrons from said source and a Mossbauer effect material contained in said container, wherein said material receives neutrons from said source and is excited thereby to produce coherent gamma radiation.

11. A system according to claim 10, wherein said material is a liquid.

12. A system according to claim 10, wherein said material is a gas.

13. A system according to claim 10, wherein said material is a solid.

14. A coherent gamma radiation system comprising an alpha particle source, a container with opposed flat parallel walls and a Mossbauer effect material in said container, said material being positioned in the path of alpha particles to be excited thereby, whereby coherent gamma radiation is produced in said container.

15. A system according to claim 14, wherein said container is a single crystal material and wherein the material in said container is a liquid.

16. A system according to claim 14, wherein said material in said container is a gas and wherein said container is formed of single crystal material.

17. A system according to claim 14, wherein said material in said container is a solid and wherein said container is formed of single crystal material.

References Cited by the Examiner

Gamma Rays From Several Elements Bombarded by 10 and 14 MEV Protons, by Wakatsuki et al., from Journal of the Physical Society of Japan, vol. 15, No. 7, July 1960, pages 1141 to 1150.

The Mossbauer Effect, by H. Lustig, from American Journal of Physics, vol. 29, No. 1, January 1961, pages 1 to 18.

RALPH G. NILSON, *Primary Examiner.*

ARCHIE R. BORCHELT, *Examiner.*